UNITED STATES PATENT OFFICE.

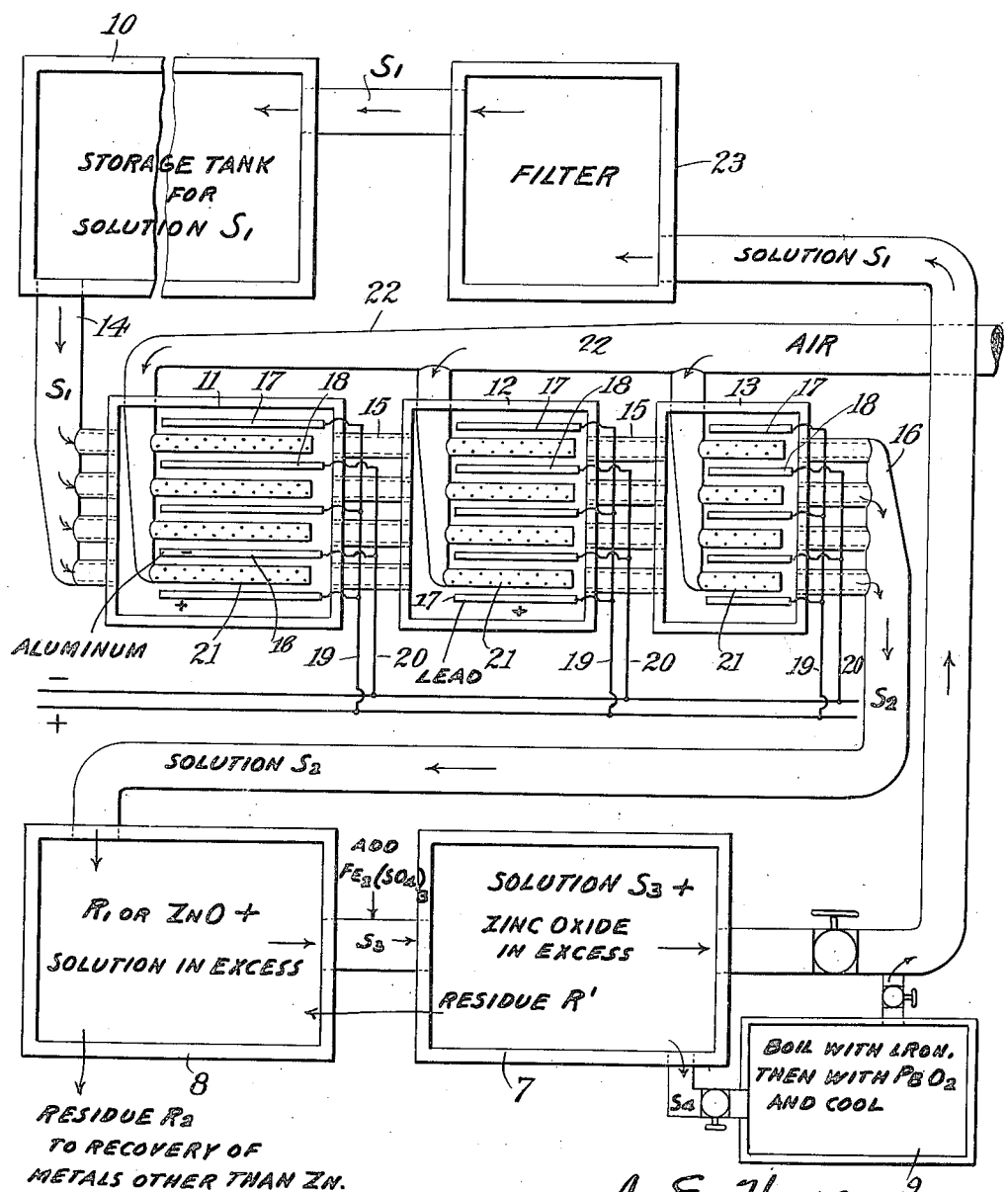

ARTHUR E. HALL, OF OMAHA, NEBRASKA, ASSIGNOR TO AMERICAN SMELTING AND REFINING COMPANY, OF NEW YORK, N. Y., A CORPORATION OF NEW JERSEY.

PURIFICATION OF ZINC-BEARING SOLUTIONS.

1,380,712.   Specification of Letters Patent.   Patented June 7, 1921.

Application filed January 7, 1916. Serial No. 70,717.

*To all whom it may concern:*

Be it known that I, ARTHUR E. HALL, a citizen of the United States, residing at Omaha, in the county of Douglas and State of Nebraska, have invented certain new and useful Improvements in the Purification of Zinc-Bearing Solutions, of which the following is a full, clear, and exact description.

In my copending application, Serial No. 39,977, filed July 15, 1915, I have described and claimed broadly a novel and efficient process for the electrolytic production of zinc. In the preferred mode of practising the invention, the process involves treatment of at least part of the zinc-bearing solution (the electrolyte) to free it of antimony, and the purifying method described in my application above-mentioned consists in treating the solution with blue powder, thereby precipitating the antimony, and also arsenic if any be present.

My present invention is in the nature of an improvement on the above process, particularly in the purification step thereof, and its object is to provide a cheaper, more effective and more convenient method for the purpose.

In the accompanying drawing I have shown in plan an apparatus suitable for practising the process in the preferred manner. Inasmuch as the invention is not limited to any particular apparatus, and since devices suitable for the purpose can readily be provided by any one skilled in the art, it is sufficient to illustrate the apparatus in a purely diagrammatic way, and I have accordingly done so in the annexed drawing.

In starting the process I treat an excess of crude zinc-oxid-bearing material with dilute sulfuric acid, for example in a suitable vessel 7. This treatment may consist in simple leaching of the crushed material, or the contents of the vessel can be agitated by any suitable means, not shown. The residue, which for convenience may be termed residue $R_1$, still contains zinc oxid, and is from time to time removed to a vessel 8, for further treatment as described hereinafter. The solution, which at this stage will be somewhat alkaline, owing to the excess of ZnO material in tank 7, may be passed directly to the filter 23 and tank 10. In case further purification is desired, the liquid may be passed to tank 9, where it is boiled with scrap iron, to precipitate antimony, arsenic and the like, and then cooled and filtered, and then is delivered to the storage tank 10. The solution in the storage tank, which we may for convenience call solution $S_1$, is thus an aqueous solution of a zinc salt, alkaline in reaction and of suitable concentration, free from iron, copper, arsenic, antimony and other impurities unfavorable to the electrolytic deposition of metallic zinc. As the process requires the presence of chlorin in this solution it may be necessary to add chlorin thereto, in the form of sodium chlorid, or zinc chlorid, or both, in amount sufficient to make the chlorin content 0.1 % or more. (This may be done in tank 10 or at any other point of the circuit.)

Solution $S_1$ is conveyed to a series or cascade of two or more electrolytic deposition cells, as 11, 12, 13, by a manifold 14, and passes from cell to cell through pipes 15. It is finally delivered from the last cell to a manifold 16. The cells contain the usual anodes and cathodes, as 17, 18, (which may be of lead and aluminum respectively), connected by taps or leads 19, 20 to the current supply-mains. In the bottom each cell is a system of perforated pipes, as 21, supplied with air under pressure by a manifold 22 leading from a suitable source not shown. The pipes 21 are arranged to discharge the air uniformly between the electrodes of each pair, that is, between each anode and cathode. The agitation thus produced is important, as it prevents or minimizes pocketing and consequent local impoverishment of the electrolyte, and also depolarizes the cathode by causing detachment of any hydrogen or other bubbles that may form thereon. These results tend to make the cathode deposits uniform, hard, firm, and smooth, thereby increasing the yield of zinc.

The current density per unit cathode-area in the several cells is an important feature of the invention. In the first cell the electrolyte comes in alkaline, but after the process has been in operation for a time it contains from 0.05% to 0.50% free sulfuric acid, liberated by the electrolytic action. This relatively low acidity gives the electrolyte a high resistance to the flow of current, and I therefore use a minimum current density. I have found in practice that thirteen amperes per square foot of cathode area is about as low as is consistent with a good deposition of metallic zinc.

In the second cell the electrolyte enters with some free sulfuric acid, and more is produced by the electrolytic action in the second cell. Because of this greater acidity the current density in the second cell can be considerably increased, for example by decreasing the cathode area, as indicated in the drawing by the shorter length of the electrodes in cell 12. Twenty amperes per square foot of cathode surface may be given as an example of a suitable density, but in any case it should, for the best results, be high enough to minimize or prevent the deposition of hydrogen bubbles on the cathodes. In like manner the current density in the succeeding cell or cells is successively higher.

As the process proceeds, it will be observed that there is less polarization of the anodes than is usually encountered, and the solution issuing from the cascade (which we will call solution $S_2$) will be found to contain free chloric acid. Moreover, lead peroxid (or dioxid) is precipitated in the cells. These results can be explained on the theory that the chlorid present (sodium or zinc chlorid, or both, as mentioned above) is oxidized to chlorate by the anode reactions and that as the solution becomes acidic this chlorate is decomposed, liberating chloric acid; and that this chloric acid attacks the lead anode to a considerable extent, forming lead chlorate, which in turn is decomposed by the anodic reactions into lead peroxid and chloric acid. In this way the polarization of the anode is eliminated or greatly diminished, a result which contributes markedly to making it possible to use a current density of thirteen amperes per square foot of cathode area in a nearly neutral electrolyte, with a drop of voltage of only about 3.5 volts across the cell.

The lead peroxid produced is of a flaky nature and sinks rapidly to the bottom of the cells, whence it is removed in any convenient manner, as by sluicing it out, after which it can be reduced to metal and cast into anodes or can be used for the purpose described hereinafter. It may be said that the cost of reducing the peroxid is much more than offset by the saving of current incident to its production.

The aforesaid solution $S_2$, issuing from the last cell, contains chloric acid, corresponding to the amount of chlorid present at the beginning of the cycle. This acid in the subsequent leaching operation oxidizes any soluble ferrous iron to ferric iron, in which form the iron is precipitated when the solution is used later to treat zinc-oxid-bearing material in excess as hereinafter described. When this solution, purified, returns to the storage tank for subsequent electrolysis in the deposition cells it contains all the chlorin, in the form of chlorids, corresponding to the original chlorids.

Solution $S_2$, issuing from the last cell, impoverished as to zinc content and enriched as to content of free acid (particularly sulfuric) is delivered in considerable excess to vessel 8 containing residue $R_1$ as previously described. This solution by reason of its high content of free acid has a high leaching efficiency and hence dissolves practically all the zinc oxid in the said residue, leaving a residue which we may call residue $R_2$. The latter is removed to a suitable filter (not shown), washed, and may then be treated in any convenient manner for the recovery of any lead, copper, gold or silver values contained.

The solution produced by the described leaching or other treatment of residue $R_1$, which we may call solution $S_3$, contains free acid (because of the excess in solution $S_2$) and, together with the filtrate from the washing of residue $R_2$, is transferred to vessel 7, where it is used to treat an excess of zinc-oxid-bearing material, as described at the outset. This operation neutralizes the remaining free acid in the solution, and precipitates iron, copper and similar impurities. Solution $S_3$ may have, however, contained antimony and arsenic and may take up more from the excess of zinc-oxid-bearing material (which it is later used to treat), since the crude material usually, of often, contains these substances in soluble form. It is desirable to get rid of the arsenic, but it is important that the antimony be removed as completely as possible before the solution returns to the electrolytic cells for electrolyzing. For this purpose I add ferric sulfate to the solution $S_3$, before it is used to treat the zinc-oxid-bearing material in vessel 7. Then in leaching or otherwise treating the last-named material, any arsenic and antimony already in the solution, and any taken up from the material mentioned, are completely precipitated as insoluble ferric arsenate and antimoniate, or other insoluble compounds.

In leaching the crude zinc-oxid-bearing material the antimony that is dissolved goes into solution as antimonic acid. Theoretically, to form insoluble ferric antimoniate according to the well-known reaction of the acid and the ferric sulfate, a certain definite amount of the latter would be needed. I have found, however, that much more of the sulfate is needed than is theoretically required to react with the amount of antimonic acid in the solution. For example, where the crude zinc-oxid-bearing material contains from two to four per cent. of antimony, the latter goes into solution as antimonic acid only to the extent of about 0.0019 pounds of antimony per gallon of solution; which amount should, in theory, require 0.0022 pounds of anhydrous ferric sulfate per gallon. Nevertheless, I find it necessary to use about twenty times this amount, or, say, 0.044 pounds anhydrous ferric sulfate, to keep the solution entirely free of antimony. Moreover, in an instance where I made up a solution containing ten times the amount of antimony mentioned, I was still able to eliminate all the antimony by the use of 0.044 pounds of sulfate per gallon. I therefore conclude that the iron has another function besides combining with the antimonic acid to make ferric antimoniate. This other function I believe to be a mechanical one of coagulating colloidal ferric antomoniate. Within the limits to which antimony is apt to be soluble in the leaching of the zinc-oxid-bearing material there seems to be a constant amount of ferric sulfate needed, regardless of the exact percentage of antimony present in the solution. The ferric sulfate is added in aqueous solution, acidulated with a little sulfuric acid to increase the solubility of the sulfate. In then leaching the crude zinc-oxid-bearing material the latter should be in sufficient excess to precipitate all the iron and neutralize all the free acid and leave the solution distinctly alkaline. Otherwise some of the antimony may not be precipitated.

The purified solution from vessel 7, which we may call solution $S_4$, is now transferred to a suitable filter 23 and thence to the storage tank 10 as solution $S_1$. This completes the cycle.

The ferric sulfate method of purifying the liquid is desirable, since the liquid remain cold at all times, and it is not necessary to artificially cool the liquor.

The foregoing operations, which, it will be understood, are carried on continuously, may be summarized briefly as follows:

From storage tank 10 solution $S_1$ is delivered to the cascade of deposition cells 11, 12, 13 and issues therefrom as solution $S_2$, poor in zinc but relatively rich in free sulfuric and chloric acids. Solution $S_2$ is conveyed to vessel 8, where it is used in excess to treat the zinc-oxid-bearing residue $R_1$ from vessel 7. Issuing from the latter it still contains free acid and, now termed solution $S_3$, is delivered with the addition of ferric sulfate to vessel 7 containing an excess of zinc-oxid bearing material, where the iron, copper, antimony and arsenic are precipitated and all the free acid is neutralized by combination with zinc. After the formation of $ZnSO_4$, this material, in solution, acts upon a further amount of ZnO, to form basic sulfates of zinc which are soluble. It is due to the presence of these basic sulfates that the solution is alkaline. Residue $R_2$, from the dissolving operation in tank 8, is removed from time to time for recovery of lead, copper, gold, silver, etc., and the residue $R_1$ from tank 7 is removed to tank 8. From tank 7 the liquid, which we now term solution $S_4$, is delivered through filter 23 to the storage tank 10 and becomes part of solution $S_1$.

As an alternative procedure for the precipitation of antimony, if for any reason it is impossible or inconvenient to use iron in the form of sulfate for purifying the solution, it may be added in metallic form, ordinary scrap iron being suitable for the purpose. This may be done in tank 9 as shown. In such case, to eliminate the antimony (and arsenic) or reduce the same to harmless or negligible proportions, a sufficient portion of solution $S_3$ is boiled with scrap iron until the substances mentioned are precipitated, at which stage the boiled solution should be practically neutral. Any metallic iron then remaining is now removed and lead peroxid (derived from the deposition cells as previously described) is added, and the boiling continued which completely precipitates any dissolved iron. Inasmuch as only enough iron is dissolved from the scrap to replace the antimony and arsenic and neutralize such free acid as is present the amount of lead peroxid needed for removal of the iron is small. However, if the peroxid is not continually available in sufficient amount, the residue remaining after the boiling operation, in which residue the lead is present as a lower oxid, having given up part of its oxygen to the iron, is converted into red lead, as by heating for a sufficient time (say forty-eight hours) with access of air. The red lead so produced can then be used instead of peroxid to precipitate the iron. Otherwise the lower oxid in said residue can be readily reduced to metallic lead if desired. The boiled solution $S_3$, and the remaining unboiled portion thereof (if only a part were treated with scrap iron and lead), are now delivered to tank 7 and there used to treat crude zinc-oxid-bearing material in excess, as described. In the latter treatment any iron in the solution is precipitated, the acid thus liberated combining with zinc to form zinc sulfate, and any antimony and arsenic present being precipitated as ferric antimoniate and arsenate or other insoluble compounds.

The zinc deposited on the cathodes or starting sheets is stripped off, and is a superior grade of zinc suitable for purposes to which any grade of zinc can be put.

It is to be understood that the invention is not limited to the procedure herein specifically described, but can be practised in other ways without departure from its spirit.

I claim:

1. The process of producing zinc by electrolytic deposition comprising (a) electrolyzing a zinc salt solution, whereby metallic zinc is deposited and the acid with which it was combined is liberated and the solution rendered acidic; (b) adding iron in soluble form to the acidic solution in amount equal to about .044 lbs. of ferric sulfate to each gallon of the solution; (c) treating an excess of zinc-bearing material with the solution, whereby zinc is dissolved from the material and the acid neutralized and any antimony present is precipitated; (d) and returning the neutral and now antimony-free solution for electrolysis.

2. The herein described method of removing antimony from a zinc-salt solution, comprising adding iron in soluble form to the extent of about .044 lbs. of ferric sulfate per gallon of solution, and treating the solution with zinc-bearing material in amount sufficient to cause precipitation of antimony.

3. The herein described method of removing antimony from an acidic zinc sulfate solution containing an oxidizing agent, comprising adding ferric sulfate, and treating the zinc-bearing material in amount sufficient to render the solution alkaline, whereby antimony and iron are precipitated.

4. A process of treating zinc-oxid-bearing material which comprises first subjecting an excess of each solution containing free sulfuric acid and containing an oxidizing reagent, to the action of a deficiency of zinc-oxid-bearing material to dissolve substantially all the zinc values therefrom, adding ferric sulfate in amount equivalent to several times the amount of antimony compounds contained in the solution, and treating the solution with an excess of zinc-oxid-bearing material, such excess being sufficient to produce an alkaline solution substantially free from antimony, and removing the solution from contact with the undissolved zinc-oxid-bearing material.

5. A process of treating zinc-oxid bearing material which comprises first subjecting an excess of solution containing free sulfuric acid and containing an oxidizing reagent, to the action of a deficiency of zinc-oxid-bearing material to dissolve substantially all the zinc values therefrom, adding ferric sulfate in amount equivalent to several times the amount of antimony compounds contained in the solution, and treating the solution with an excess of zinc-oxid-bearing material, such excess being sufficient to produce an alkaline solution substantially free from antimony, removing the solution from contact with the undissolved zinc-oxid-bearing material, and thereafter boiling the said liquor with metallic iron, to completely remove the dissolved antimony.

6. The herein described process, which comprises treating with a deficiency of zinc-oxid-bearing material, an acid solution containing an oxidizing agent, adding to the resulting liquor an amount of water-soluble ferric salt equivalent to more than the amount of arsenic and antimony compounds in the liquor, thereafter treating the resulting liquor with an excess of zinc-oxid-bearing material to produce a liquor free from arsenic and antimony.

7. In the purification of acid zinc solutions containing small amounts of antimony, the steps of adding thereto an amount of ferric salt equivalent to not less than about .044 pounds of ferric sulfate per gallon of solution, and thereafter treating the solution with an excess of zinc-oxid-bearing material.

8. In the purification of acid zinc solutions containing small amounts of antimony, the steps of adding thereto, while said solution is cold, an amount of ferric salt equivalent to not less than about .044 pounds of ferric sulfate per gallon of solution, and thereafter treating the solution with an excess of zinc-oxid-bearing material.

In testimony whereof I hereunto affix my signature.

ARTHUR E. HALL.